(12) United States Patent
Akino et al.

(10) Patent No.: US 9,690,106 B2
(45) Date of Patent: Jun. 27, 2017

(54) LIGHT HOMOGENIZATION DEVICE

(71) Applicant: Mitsubishi Electric Corporation, Tokyo (JP)

(72) Inventors: Yosuke Akino, Tokyo (JP); Takayuki Yanagisawa, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 15/317,993

(22) PCT Filed: Jul. 2, 2014

(86) PCT No.: PCT/JP2014/067659
§ 371 (c)(1),
(2) Date: Dec. 12, 2016

(87) PCT Pub. No.: WO2016/002025
PCT Pub. Date: Jan. 7, 2016

(65) Prior Publication Data
US 2017/0115494 A1    Apr. 27, 2017

(51) Int. Cl.
*G02B 6/26* (2006.01)
*G02B 27/09* (2006.01)
*G02B 19/00* (2006.01)

(52) U.S. Cl.
CPC ......... *G02B 27/0994* (2013.01); *G02B 6/262* (2013.01); *G02B 19/0019* (2013.01); *G02B 19/0047* (2013.01)

(58) Field of Classification Search
CPC .................................. G02B 27/0994
See application file for complete search history.

(56) References Cited

U.S. PATENT DOCUMENTS

| | | | | |
|---|---|---|---|---|
| 6,547,400 B1 * | 4/2003 | Yokoyama | ........... | G03B 21/208 345/39 |
| 7,565,049 B2 * | 7/2009 | Sugita | .................. | H04N 9/3129 348/E9.026 |
| 7,832,878 B2 * | 11/2010 | Brukilacchio | ....... | G02B 6/4298 313/512 |
| 8,750,344 B2 * | 6/2014 | Kopf | .................. | G02B 27/0994 372/101 |
| 2003/0031029 A1 * | 2/2003 | Kawaai | .................. | G02B 27/09 362/551 |
| 2005/0146891 A1 | 7/2005 | Hatakeyama | | |

(Continued)

FOREIGN PATENT DOCUMENTS

| JP | 2003-142387 A | 5/2003 |
|---|---|---|
| JP | 2005-115094 A | 4/2005 |
| JP | 2015138036 A * | 7/2015 |

OTHER PUBLICATIONS

Written Opinion issued in PCT/JP2014/067659; mailed Sep. 30, 2014.

(Continued)

*Primary Examiner* — Sung Pak
(74) *Attorney, Agent, or Firm* — Studebaker & Brackett PC

(57) ABSTRACT

A ray of light 2 enters vertically to an incident surface 5a of a rod integrator 5, while another ray of light 4 enters obliquely to the incident surface 5a of the rod integrator 5. As a result, the outermost spread angle of the ray of light 4 after entering the rod integrator 5 coincides the outermost spread angle of the ray of light 2 after entering the rod integrator 5.

5 Claims, 3 Drawing Sheets

(56) References Cited

U.S. PATENT DOCUMENTS

2006/0072877 A1\* 4/2006 Tanaka .................. G02B 6/001
 385/39
2007/0140616 A1\* 6/2007 Sugita ................ G02B 27/0994
 385/32

OTHER PUBLICATIONS

International Search Report issued in PCT/JP2014/067659; mailed Sep. 30, 2014.

\* cited by examiner

LIGHT HOMOGENIZATION DEVICE

TECHNICAL FIELD

The present invention relates to alight homogenization device to homogenize luminance distribution or to homogenize spread angle of light.

BACKGROUND ART

As a light homogenization device to homogenize luminance distribution of light emitted from an illumination light source, a light homogenization device using an optical integrator is disclosed in the Patent Literature 1 below.

This optical integrator is composed of a rod integrator formed by a glass rod of an inner-surface reflection type using an optical material such as quartz glass or fluorite.

The rod integrator can emit light having homogenized luminance distribution from an emitting surface thereof by propagating light entering from a incident surface thereof with total reflection.

However, when a plurality of rays of light having different spread angles enters from an incident surface of a rod integrator with a same incident angle, even though the luminance distribution of each of the rays of light is homogenized, the plurality of rays of light is emitted from the emitting surface of the rod integrator while their spread angles are still different to each other. Therefore, a projection optical system is used to project an image on the emitting surface of the rod integrator.

CITATION LIST

Patent Literature

Patent Literature 1: JP 2003-142387 A (FIG. 1)

SUMMARY OF INVENTION

Technical Problem

Since conventional light homogenization devices are configured in the above manner, a projection optical system is used to project an image on the emitting surface of a rod integrator. However, due to influence of aberration or the like of lenses in the projection optical system, the luminance distribution homogenized by the rod integrator becomes inhomogeneous and this inhomogeneity is different depending on the wavelength of light. Thus, when a plurality of light sources emitting laser beams having different wavelengths (e.g. a red laser, a green laser, and a blue laser) is used, there is a problem that uneven colors are generated.

The present invention is devised in order to solve the aforementioned problem, and an object of the invention is to obtain a light homogenization device in which the spread angles of a plurality of rays of light can be adjusted to a same angle.

Solution to Problem

A light homogenization device according to the present invention includes a propagation optical system to propagate light; and a rod integrator having an incident surface and an emitting surface. The light propagated through the propagation optical system enters from the incident surface, the light entered from the incident surface is propagated through the rod integrator with total reflection, and the light whose luminance distribution is homogenized is emitted from the emitting surface. When the propagation optical system propagates a plurality of rays of light having different spread angles, the plurality of rays of light is entered to the incident surface of the rod integrator with incident angles where spread angles of the plurality of rays of light after entering the rod integrator coincide with each other.

Advantageous Effects of Invention

According to this invention, when a propagation optical system propagates a plurality of rays of light having different spread angles, the rays of light enter an incident surface of a rod integrator with respective incident angles where spread angles of the rays of light after entering the rod integrator coincide with each other. As a result, there is an effect that the spread angles of the rays of light can be adjusted to a same angle.

DESCRIPTION OF EMBODIMENTS

First Embodiment

Figure 1:
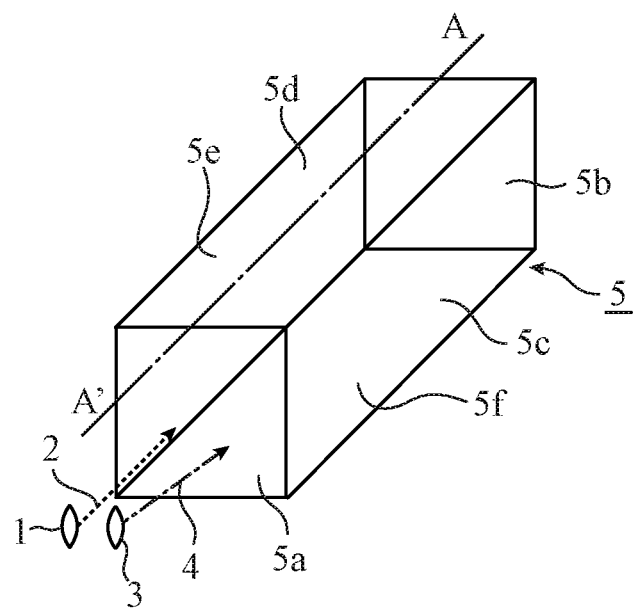
FIG. 1 is a perspective view illustrating alight homogenization device according to a first embodiment of the present invention.
Figure 2:
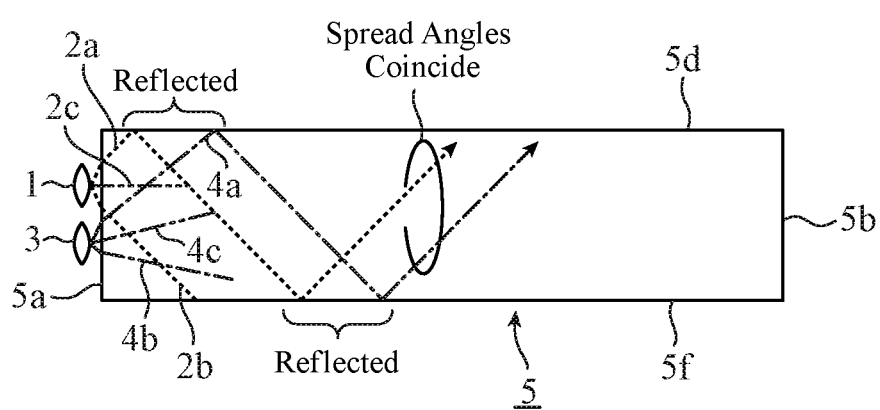
FIG. 2 is a cross-sectional view along a line A-A' in the light homogenization device in FIG. 1.

FIG. 1 is a perspective view illustrating a light homogenization device according to a first embodiment of the present invention. FIG. 2 is a cross-sectional view along a line A-A' in the light homogenization device in FIG. 1.

In the first embodiment, an example where the light homogenization device includes condensing optical systems 1 and 3, which are propagation optical systems to propagate light, and a rod integrator 5 will be explained.

In FIGS. 1 and 2, the condensing optical system 1 is formed by a lens or the like, for example, and is an optical component to condense a ray of light 2 on an incident surface 5a of the rod integrator 5.

The condensing optical system 3 is formed by a lens or the like, for example, and is an optical component to condense a ray of light 4 on the incident surface 5a of the rod integrator 5.

In the first embodiment, the spread angles of the rays of light 2 and 4 condensed by the condensing optical systems 1 and 3 respectively are different to each other. In the following description, it is assumed that the spread angle of the ray of light 2 is larger than the spread angle of the ray of light 4.

FIG. 1 illustrates an example where each of the condensing optical systems 1 and 3 condenses single ray of light; however, each one of the condensing optical systems may condense the plurality of rays of light 2 and 4.

The rod integrator 5 is an optical component, to which the rays of light 2 and 4 condensed by the condensing optical systems 1 and 3 enter from the incident surface 5a thereof, to propagate the entered rays of light 2 and 4 while totally reflecting the light, and to thereby emit the rays of light 2 and 4 having homogenized luminance distribution from an emitting surface 5b thereof.

The incident surface 5a and the emitting surface 5b of the rays of light 2 and 4 of the rod integrator 5 are parallel to each other. The whole area of the incident surface 5a and the emitting surface 5b are optically polished.

Side surfaces 5c to 5f of the rod integrator 5 are reflecting surfaces of the rays of light 2 and 4 and the whole area thereof are optically polished.

FIG. 1 illustrates an example where the shape of the rod integrator 5 is a quadratic prism; however, the shape of the rod integrator 5 is not limited thereto and may be a cylinder or a polygonal prism, for example.

Alternatively, the rod integrator 5 may be alight pipe where an inner part thereof is hollow and the internal side surfaces 5c to 5f are formed by mirrors.

As described above, the spread angle of the ray of light 2 and the spread angle of the ray of light 4 are different to each other (in the example of FIG. 1, the spread angle of the ray of light 2 is larger than the spread angle of the ray of light 4), and to make the spread angles of the rays of light 2 and 4 after entering the rod integrator 5 coincide with each other, the incident angles of the rays of light 2 and 4 with respect to the incident surface 5a of the rod integrator 5 are adjusted to be different to each other.

In the example of FIG. 1, the ray of light 2 enters vertically to the incident surface 5a of the rod integrator 5 while the ray of light 4 enters obliquely to the incident surface 5a of the rod integrator 5.

Since the whole area of the incident surface 5a of the rod integrator 5 is optically polished, the reflectance of the incident surface 5a is determined by the Fresnel reflection derived from the refractive index of the rod integrator 5 and the incident angles of the rays of light 2 and 4 with respect to the incident surface 5a. The reflectance of the emitting surface 5b of the rod integrator 5 is also determined in a similar manner to that of the incident surface 5a.

By applying an anti-reflection film of light on each of the incident surface 5a and the emitting surface 5b of the rod integrator 5, it is possible to suppress the loss upon incidence of the rays of light 2 and 4.

Note that, it is assumed that, material with low absorbance of the rays of light 2 and 4 is used for the rod integrator 5. When the wavelengths of the rays of light 2 and 4 are in the visible region for example, a material such as optical glass like BK7, synthetic quartz or the like is used.

Next, operations will be described.

The condensing optical system 1 condenses the ray of light 2 on the incident surface 5a of the rod integrator 5, and the condensing optical system 3 condenses the ray of light 4 on the incident surface 5a of the rod integrator 5.

As a result, the rays of light 2 and 4 enter from the incident surface 5a of the rod integrator 5, and refracted at the incident surface 5a of the rod integrator 5.

Since the rays of light 2 and 4 are refracted at the incident surface 5a, each of the spread angles of the rays of light 2 and 4 changes from before to after the incidence on the rod integrator 5.

The ray of light 2 entered the rod integrator 5 is propagated in the rod integrator 5. Since the ray of light 2 spreads, as illustrated in FIG. 2, the ray of light 2 includes light traveling toward the side surface 5d of the rod integrator 5 and light traveling toward the side surface 5f of the rod integrator 5 (the light traveling toward the side surface 5d is denoted as 2a, and the light traveling toward the side surface 5f is denoted as 2b in FIG. 2). The light 2a traveling toward the side surface 5d of the rod integrator 5 is reflected at the side surface 5d, and the light 2b traveling toward the side surface 5f of the rod integrator 5 is reflected at the side surface 5f.

Also, the ray of light 4 entered the rod integrator 5 is propagated in the rod integrator 5. Since the ray of light 4 spreads, as illustrated in FIG. 2, the ray of light 4 includes light traveling toward the side surface 5d of the rod integrator 5 and light traveling toward the side surface 5f of the rod integrator 5 (the light traveling toward the side surface 5d is denoted as 4a, and the light traveling toward the side surface 5f is denoted as 4b in FIG. 2). The light 4a traveling toward the side surface 5d of the rod integrator 5 is reflected at the side surface 5d, and the light 4b traveling toward the side surface 5f of the rod integrator 5 is reflected at the side surface 5f.

Note that, since the side surfaces 5d and 5f of the rod integrator 5 form boundary surfaces between the air and the rod integrator 5, a ray of light having an incident angle larger than the critical angle determined by the refractive indices of the air and the rod integrator 5 is reflected at the side surfaces 5d and 5f of the rod integrator 5 while a ray of light having an incident angle smaller than the critical angle is refracted at the side surfaces 5d and 5f of the rod integrator 5 and emitted outside the rod integrator 5.

The ray of light 2 reflect d at the side surface 5d of the rod integrator 5 travels toward the side surface 5f of the rod integrator 5. The ray of light 2 travels toward the side surface 5f of the rod integrator 5 is then reflected at the side surface 5f.

After reflection of the ray of light 2 is repeated between the side surface 5d and the side surface 5f of the rod integrator 5, the ray of light 2 reached the emitting surface 5b of the rod integrator 5 is emitted outside the rod integrator 5 from the emitting surface 5b.

The ray of light 2 entered the rod integrator 5 is propagated in the rod integrator 5, during which the central part and peripheral parts of the light are mixed, and as a result, the luminance distribution thereof is homogenized on the emitting surface 5b of the rod integrator 5.

Also, the ray of light 4 reflected at the side surface 5d of the rod integrator 5 travels toward the side surface 5f of the rod integrator 5. The ray of light 4 travels toward the side surface 5f of the rod integrator 5 is then reflected at the side surface 5f.

After reflection of the ray of light 4 is repeated between the side surface 5d and the side surface 5f of the rod integrator 5, the ray of light 4 reached the emitting surface 5b of the rod integrator 5 is emitted outside the rod integrator 5 from the emitting surface 5b.

The ray of light 4 entered the rod integrator 5 is propagated in the rod integrator 5, during which the central part and peripheral parts of the light are mixed, and as a result, its luminance distribution is homogenized on the emitting surface 5b of the rod integrator 5.

Here, repeated reflection of the rays of light 2 and 4 at the side surfaces 5d and 5f of the rod integrator 5 is described, and the reflection at the side surfaces 5c and 5e of the rod integrator 5 is not referred to. Actually, however, the rays of light 2 and 4 are repeatedly reflected between the side surface 5c and the side surface 5e of the rod integrator 5 similarly to the reflection at the side surfaces 3d and 5f.

As already explained, the spread angles of the rays of light 2 and 4 change from before to after entering the rod integrator 5 due to refraction of the rays of light 2 and 4 at the incident surface 5a. In the first embodiment, the spread angle of the ray of light 4 before entering the rod integrator 5 is smaller than the spread angle of the ray of light 2 before entering the rod integrator 5. Therefore, if the incident angles of the rays of light 2 and 4 on the incident surface 5a of the rod integrator 5 are the same, the spread angle of the ray of light 4 after entering the rod integrator is also smaller than the spread angle of the ray of light 2 after entering the rod integrator 5.

Thus, in the first embodiment, the incident angles of the rays of light 2 and 4 with respect to the incident surface 5a of the rod integrator 5 are set to be different to each other such that the spread angle of the ray of light 4 after entering the rod integrator 5 coincides with the spread angle of the ray of light 2 after entering the rod integrator 5.

In the example of FIG. 1, the ray of light 2 enters vertically to the incident surface 5a of the rod integrator 5 while the ray of light 4 enters obliquely to the incident surface 5a of the rod integrator 5.

Specifically, when the outermost spread angle of the ray of light 2 (the angle of the light 2a) has a half angle of 25 degrees for example and the outermost spread angle of the ray of light 4 (the angle of the light 4a) has a half angle of 15 degrees for example, the angular difference of the outermost spread angles of the ray of light 2 and the ray of light 4 is a half angle of 10 degrees. Thus, by inclining the central axis 4c of the ray of light 4 by 10 degrees with respect to the central axis 2c of the ray of light 2, the spread angles of the rays of light 2 and 4 after entering the rod integrator 5 coincide with each other. Therefore, the position or the angle of the condensing optical system 3 is adjusted such that the ray of light 4 enters the incident surface 5a of the rod integrator 5 with the incident angle of 10 degrees when the central axis 2c of the ray of light 2 is vertical with respect to the incident surface 5a of the rod integrator 5.

In the first embodiment, the ray of light 2 enters vertically to the incident surface 5a of the rod integrator 5, while the ray of light 4 enters obliquely to the incident surface 5a of the rod integrator 5, such that the outermost spread angle of the ray of light 4 after entering the rod integrator 5 coincides with the outermost spread angle of the ray of light 2 after entering the rod integrator 5, and consequently, there is no need to mount a projection optical system. As a result, even when a plurality of light sources emitting laser lights having different wavelengths (e.g. a red laser, a green laser, and a blue laser) is used, an uneven color due to mounting of a projection optical system is not generated.

In the above manner in the first embodiment, the following effects can be achieved: a homogenized luminance distribution can be achieved on the emitting surface 5b of the rod integrator and the spread angles of the plurality of rays of light 2 and 4 having different spread angles can be adjusted to a same angle.

In the first embodiment, a case where two rays of light 2 and 4 having different spread angles enter is described; however, this embodiment can be applied similarly to a case where three or more rays of light having different spread angles enter.

When three or more rays of light having different spread angles enter, by adjusting incident angles of the three or more rays of light with respect to the incident surface 5a of the rod integrator 5 to be different from each other, it is possible for the outermost spread angles of the three or more rays of light after entering the rod integrator 5 to coincide with each other.

For example, it is enough that the ray of light having the largest spread angle enters vertically to the incident surface 5a, and for the other rays of light, the smaller the spread angle of the ray of light is, the larger the oblique angle of the ray of light with respect to the incident surface 5a becomes.

According to the above configuration, this embodiment can be applied to a plurality of laser beams having different spread angles (e.g. a red laser beam, a green laser beam, and a blue laser beam).

Second Embodiment

Figure 3:
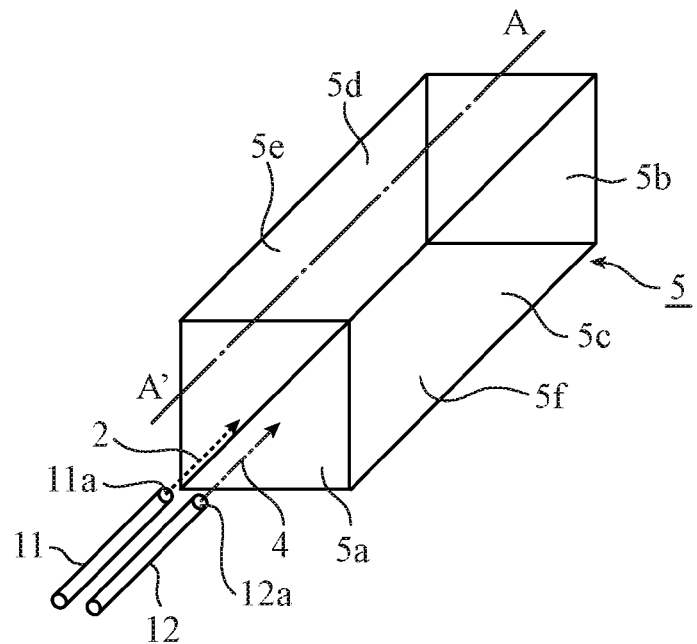
FIG. 3 is a perspective view illustrating alight homogenization device according to a second embodiment of the present invention.
Figure 4:
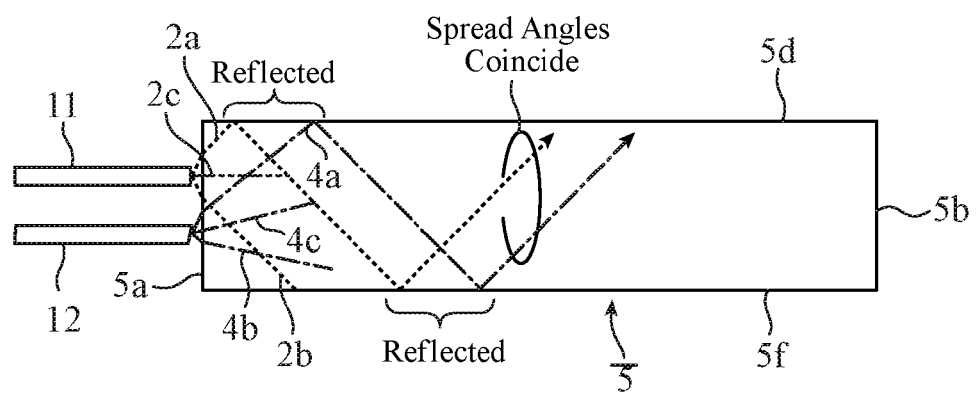
FIG. 4 is a cross-sectional view along a line A-A' in the light of homogenization device in FIG. 3.

FIG. 3 is a perspective view illustrating a light homogenization device according to a second embodiment of the invention. FIG. 4 is a cross-sectional view along a line A-A' in the light homogenization device in FIG. 3.

Figure 5:
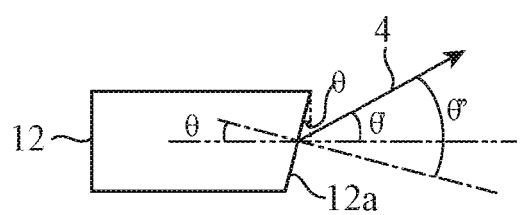
FIG. 5 is an explanatory diagram illustrating an inclination angle of an emitting end surface 12a of a fiber 12 of the light homogenization device according to the second embodiment of the present invention.

In addition, FIG. 5 is an explanatory diagram illustrating an inclination angle of an emitting end surface 12a of a fiber 12 of the light homogenization device according to the second embodiment of the invention.

In the second embodiment, an example where the light homogenization device includes fibers 11 and 12, which are propagation optical systems to propagate light, and a rod integrator 5, will be explained.

In FIGS. 3 to 5, the same symbols as those in FIGS. 1 and 2 represent the same or corresponding parts and thus descriptions thereon are omitted.

The fiber 11 propagates ray of light 2 and emits the ray of light 2 from an emitting end surface 11a thereof toward an incident surface 5a of the rod integrator 5.

The emitting end surface 11a of the fiber 11 is vertical to the central axis of the fiber 11 in order to be arranged parallel to the incident surface 5a of the rod integrator 5.

The fiber 12 propagates ray of light 4 and emits the ay of light 4 from an emitting end surface a thereof toward the incident surface 5a of the rod integrator 5.

The central axis of the fiber 12 is parallel to the central axis of the fiber 11. The emitting end surface 12a of the fiber 12 is obliquely cut with respect to the centered axis of the fiber 12 such that the emitting end surface 12a of the fiber 12 is inclined with respect to the incident surface 5a of the rod integrator 5.

It is possible to suppress emission loss of each of the rays of light 2 and 4 by applying an anti-reflection film of light on each of the emitting end surfaces 11a and 12a of the fibers 11 and 12. In addition, it is possible to suppress destruction of light sources (light sources connected to the fibers) changes in characteristics accompanied by reflection at the emitting end surfaces 11a and 12a of the fibers 11 and 12.

In particular, since the emitting end surface 11a of the fiber 11 is vertical to the central axis of the fiber 11 and reflection to the fiber 11 is large, it is highly required to apply an anti-reflection film. The emitting end surface 12a of the fiber 12 is obliquely cut and has a little reflection to the fiber 12 and thus, depending on the inclination angle of the emitting end surface 12a, the anti-reflection film is not required.

When the beams of the rays of light 2 and 4 emitted from the fibers 11 and 12 spread, the rays of light 2 and 4 emitted from the fibers 11 and 12 may be kicked at the incident surface 5a of the rod integrator 5, resulting in lowered coupling efficiency. Therefore, when the beams of the rays of light 2 and 4 emitted from the fibers 11 and 12 spread, it is necessary to dispose the emitting end surfaces 11a and 12a of the fibers 11 and 12 close to the incident surface 5a of the rod integrator 5 to suppress coupling loss.

In FIG. 3, the fiber 11 and the fiber 12 are described as separate members; however, the fiber 11 and the fiber 12 may be bundled to form a bundle fiber.

Next, operations will be described.

The ray of light 2 emitted from the fiber 11 is propagated in a space and then enters the rod integrator 5 from the incident surface 5a. The ray of light 2 is refracted at the incident surface 5a of the rod integrator 5 upon entering the rod integrator The ray of light 4 emitted from the fiber 12 is propagated in a space and then enters the rod integrator 5 from the incident surface 5a. The ray of light 4 is refracted at the incident surface 5a of the rod integrator 5 upon entering the rod integrator 5.

The ray of light 2 entered the rod integrator 5 propagates in the rod integrator 5. Since the ray of light 2 spreads, as illustrated in FIG. 4, the ray of light 2 includes light traveling toward the side surface 5d of the rod integrator 5 and light traveling toward the side surface 5f of the rod integrator 5 (the light traveling toward the side surface 5d is denoted as 2a, and the light traveling toward the side surface 5f is denoted as 2b in FIG. 4). The light 2a traveling toward the side surface 5d of the rod integrator 5 is reflected at the side surface 5d, and the 2b traveling toward the side surface 5f of the rod integrator 5 is reflected at the side surface 5f.

Also, the ray of light 4 entered the rod integrator 5 propagates in the rod integrator 5. Since the ray of light 4 spreads, as illustrated in FIG. 4, the ray of light 4 includes light traveling toward the side surface 5d of the rod integrator 5 and light traveling toward the side surface 5f of the rod integrator 5 (the light traveling toward the side surface 5d is denoted as 4a, and the light traveling toward the side surface 5f is denoted as 4b in FIG. 4). The light 4a traveling toward the side surface 5d of the rod integrator 5 is reflected at the side surface 5d, and the light 4b traveling toward the side surface 5f of the rod integrator 5 is reflected at the side surface 5f.

Note that, since the side surfaces 5d and 5f of the rod integrator 5 form boundary surfaces between the air and the rod integrator 5, as described above, a ray of light having an incident angle larger than a critical angle determined by refractive indices of the air and the rod integrator 5 is reflected at the side surfaces 3d and 5f of the rod integrator 5, and a ray of light having an incident angle smaller than the critical angle is refracted at the side surfaces 5d and 5f of the rod integrator 5 and emitted outside the rod integrator 5.

The ray of light 2 reflected at the side surface 5d of the rod integrator 5 travels toward the side surface 5f of the rod integrator 5, and the ray of light 2 traveled toward the side surface 5f of the rod integrator 5 is then reflected at the side surface 5f.

After reflection of the ray of light 2 is repeated between the side surface 5d and the side surface 5f of the rod integrator 5, the ray of light 2 reached the emitting surface 5b of the rod integrator 5 is emitted outside the rod integrator 5 from the emitting surface 5b.

The ray of light 2 entered the rod integrator 5 propagates in the rod integrator 5, during which the central part and peripheral parts of the light are mixed, thereby resulting in homogenized luminance distribution on the emitting surface 5b of the rod integrator 5.

Also, the ray of light 4 reflected at the side surface 5d of the rod integrator 5 travels toward the side surface 5f of the rod integrator 5, and the ray of light 4 traveled toward the side surface 5f of the rod integrator 5 is then reflected at the side surface 517

After reflection of the ray of light 4 is repeated between the side surface 5d and the side surface 5f of the rod integrator 5, the ray of light 4 reached the emitting surface 5b of the rod integrator 5 is emitted outside the rod integrator 5 from the emitting surface 5b.

The ray of light 4 entered the rod integrator 5 propagates in the rod integrator 5, during which the central part and peripheral parts of the light are mixed, thereby resulting in homogenized luminance distribution on the emitting surface 5b of the rod integrator 5.

Here, though the repeated reflection of the rays of light 2 and 4 at the side surfaces 5d and 5f of the rod integrator 5 is described, the reflection at the side surfaces 5c and 5e of the rod integrator 5 is not referred to. Actually, however, the rays of light 2 and 4 are repeatedly reflected between the side surface 5c and the side surface 5c of the rod integrator 5 similarly to the reflection at the side surfaces 5d and 5f.

In the second embodiment, in order to make the outermost spread angle of the ray of light 2 (the angle of the light 2a) after entering the rod integrator 5 coincide with the outermost spread angle of the ray of light 4 (the angle of the light 4a) after entering the rod integrator 5, the emitting end surface 12a of the fiber 12 is obliquely cut with respect to the central axis thereof.

Hereinafter, the inclination angle of the emitting end surface 12a of the fiber 12 will be described.

For example, when the angular difference between the outermost spread angle of the ray of light 2 and the outermost spread angle of the ray of light 4 is denoted as φ, by inclining the optical axis of the ray of light 4 emitted from the fiber 12 by the angle of φ with respect to the optical axis of the ray of light 2 emitted from the fiber 11, the outermost spread angle of the ray of light 2 after entering the rod integrator 5d the outermost spread angle of the ray of light 4 after entering the rod integrator 5 coincide with each other.

When the fiber 12 emits the ray of light 4, the ray of light 4 is refracted at a boundary surface between the core of the fiber 12 and the air. This refracting angle becomes the inclination θ' of the optical axis of the ray of light 4 (the ray of light 4 emitted from the emitting end surface 12a of the fiber 12) with respect to the central axis of the fiber 12.

Therefore, when the refractive index between the core of the fiber 12 and the air is denoted as n, the inclination angle of the emitting end surface 12a as θ, and the refracting angle at the boundary surface between the core of the fiber and the air as θ'', the relation between the inclination angle θ and the refracting angle θ'' is expressed by the following formula (1) according to Snell's law $n \times \sin\theta = \sin\theta''$ $$\theta' = \theta'' - \theta \qquad (1)$$

Therefore, the inclination angle θ of the emitting end surface 12a can be calculated by the following formula (2).

$$\theta = \sin^{-1}\left(\frac{\sin\theta' + \theta}{n}\right) \qquad (2)$$

When the core of the fiber 12 is formed by synthetic quartz and the wavelength of the ray of light 4 is 633 nm for example, the refractive index n is 1.457. Here, when the angular difference between the outermost spread angle of the ray of light 2 and the outermost spread angle of the ray of light 4 is 10 degrees of half angle, for example, the inclination angle θ of the emitting end surface 12a of the fiber 12, where the outermost spread angle of the ray of light 2 after entering the rod integrator 5 and the outermost spread angle of the ray of light 4 after entering the rod integrator 5 coincide with each other, becomes 20.19 degrees.

In the second embodiment, the emitting end surface 11a of the fiber 11 is arranged to be parallel to the incident surface 5a of the rod integrator 5, while the emitting end surface 12a of the fiber 12 is obliquely cut with respect to the central axis of the fiber 12 such that the emitting end surface 12a of the fiber 12 is inclined with respect to the incident surface 5a of the rod integrator 5. As a result, the outermost spread angle of the ray of light 4 after entering the rod integrator coincide with the outermost spread angle of the ray of light 2 after entering the rod integrator 5. Thus, there is no need to mount a projection optical system. As a result, even when a plurality of light sources emitting laser beams having different wavelengths (e.g. a red laser, a green laser, and a blue laser) is used, an uneven color due to mounting of a projection optical system is not generated.

In the above manner, in the second embodiment, the following effects can be achieved: a homogenized luminance distribution can be obtained on the emitting surface 5b of the rod integrator 5; and the spread angles of the plurality of rays of light 2 and 4 having different spread angles can be adjusted to a same angle.

In the second embodiment, a case where two rays of light 2 and 4 having different spread angles enter is described; however, this embodiment can be applied similarly to a case where a plurality of rays of light having different wavelengths or three or more rays of light having different spread angles enter.

When the wavelengths are different to each other, the inclination angle θ of emitting end surface of each of the plurality of fibers can be set by considering chromatic dispersion. Also, when three or more rays of light having different spread angles enter, the present embodiment can be applied by setting the inclination angles θ of emitting end surfaces of the plurality of fibers with respect to the incident surface 5a of the rod integrator 5 to be different from each other such that the spread angles of the three or more rays of light after entering the rod integrator 5 coincide with each other.

For example, the present embodiment can be applied by arranging an emitting end surface of the fiber emitting the ray of light having the largest spread angle to be parallel to the incident surface 5a of the rod integrator 5, and by cutting the emitting end surfaces of the other fibers obliquely with respect to the central axis such that the smaller the spread angle of the ray of light emitted from an emitting end surface of the fiber is, the larger the oblique angle of the emitting end surface with respect to the incident surface 5a of the rod integrator 5 becomes.

With such a configuration, this embodiment can be applied to a plurality of laser beams having different spread angles (e.g. a red laser beam, a green laser beam, and a blue laser beam).

Third Embodiment

Figure 6:
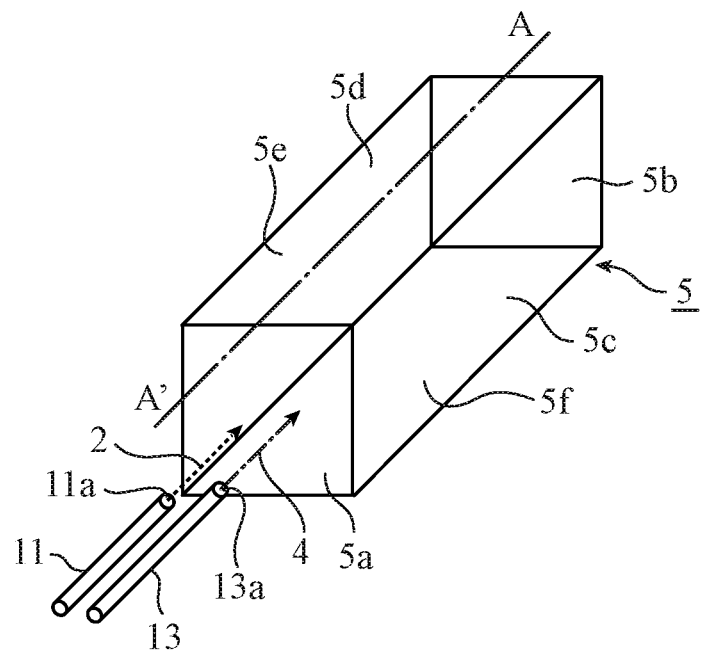
FIG. 6 is a perspective view illustrating a light homogenization device according to a third embodiment of the present invention.
Figure 7:
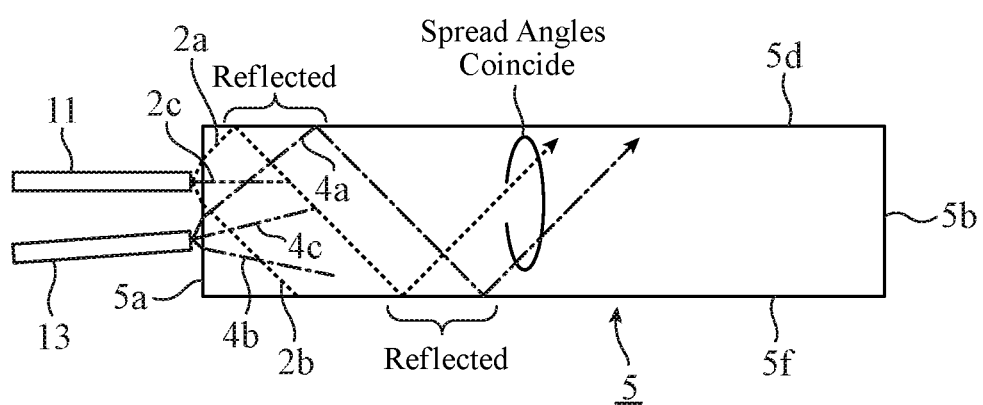
FIG. 7 is a cross-sectional view along a line A-A' in the light homogenization device in FIG. 6.

FIG. 6 is a perspective view illustrating a light homogenization device according to a third embodiment of the invention. FIG. 7 is a cross-sectional view along a line A-A' in the light homogenization device in FIG. 6.

In the third embodiment, an example where the light homogenization device includes fibers 11 and 13, which are propagation optical systems to propagate light, and a rod integrator 5, will be explained.

In FIGS. 6 and 7, the same symbols as those in FIGS. 3 and 4 represent the same or corresponding parts and thus descriptions thereon are omitted.

The fiber 13 propagates ray of light 4 and emits the ray of light 4 from an emitting end surface 13a thereof toward an incident surface 5a of the rod integrator 5.

The emitting end surface 13a of the fiber 13 is vertical to the central axis of the fiber 13. However, the central axis of the fiber 13 is inclined with respect to the central axis of the fiber 11 such that the emitting end surface 13a of the fiber 13 is inclined with respect to the incident surface 5a of the rod integrator 5.

The fiber 13 includes a core and cladding. The refractive index of the cladding is smaller than the refractive index of the core. For each of the core and the cladding of the fiber 13, a material with low absorbance of the ray of light 4 is used.

By applying an anti-reflection film of light on the emitting end surface 13a of the fiber 13, the loss of the ray of light 4 upon emittance can be suppressed. Also, it is possible to suppress destruction of light sources (light sources connected to the fiber 13) and changes in characteristics accompanied by reflection at the emitting end surface 13a of the fiber 13. Since the emitting end surface 13a of the fiber 13 is vertical to the central axis of the fiber 13 and reflection to the fiber 13 is large, it is highly required to apply an anti-reflection film.

Next, operations will be described.

The ray of light 2 emitted from the fiber 11 propagates in a space and then enters the rod integrator 5 from the incident surface 5a thereof. The ray of light 2 is refracted at the incident surface 5a of the rod integrator 5 upon entering the rod integrator 5.

The ray of light 4 emitted from the fiber 13 is propagated in a space and then enters the rod integrator 5 from the incident surface 5a thereof. The ray of light 4 is refracted at the incident surface 5a of the rod integrator 5 upon entering the rod integrator 5.

The ray of light 2 entered the rod integrator 5 propagates in the rod integrator 5. Since the ray of light 2 spreads, as illustrated in FIG. 7, the ray of light 2 includes light traveling toward the side surface 5d of the rod integrator 5 and light traveling toward the side surface 5f of the rod integrator 5 (the light traveling toward the side surface 5d is denoted as 2a, and the light traveling toward the side surface 5f is denoted as 2b in FIG. 7). The light 2a traveling toward the side surface 5d of the rod integrator 5 is reflected at the side surface 5d, and the light 2b traveling toward the side surface 5f of the rod integrator 5 is reflected at the side surface 5f.

Also, the ray of light 4 entered the rod integrator 5 propagates in the rod integrator 5. Since the ray of light 4 spreads, as illustrated in FIG. 7, the ray of light 4 includes light traveling toward the side surface 5d of the rod integrator 5 and light traveling toward the side surface 5f of the rod integrator 5 (the light traveling toward the side surface 5d is denoted as 4a, and the light traveling toward the side surface 5f is denoted as 4b in FIG. 7). The light 4a traveling toward the side surface 5d of the rod integrator 5 is reflected at the side surface 5d, and the light 4b traveling toward the side surface 5f of the rod integrator 5 is reflected at the side surface 5f.

Note that, since the side surfaces 5d and 5f of the rod integrator 5 form boundary surfaces between the air and the rod integrator 5, as described above, a ray of light having an incident angle larger than a critical angle determined by refractive indices of the air and the rod integrator 5 is reflected at the side surfaces 5d and 5f of the rod integrator 5, and a ray of light having an incident angle smaller than the critical angle is reflected at the side surfaces 5d and 5f of the rod integrator 5 and emitted outside the rod integrator 5.

The ray of light 2 reflected at the side surface 5d of the rod integrator 5 travels toward the side surface 5f of the rod integrator 5, and the ray of light 2 traveled toward the side surface 5f of the rod integrator 5 is then reflected at the side surface 5f.

After reflection of the ray of light 2 is repeated between the side surface 5d and the side surface 5f of the rod integrator 5, the ray of light 2 reached the emitting surface 5b of the rod integrator 5 is emitted outside the rod integrator 5 from the emitting surface 5b.

The ray of light 2 entered the rod integrator 5 propagates in the rod integrator 5, during which the central part and peripheral parts of the light are mixed, thereby resulting in homogenized luminance distribution on the emitting surface 5b of the rod integrator 5.

Also, the ray of light 4 reflected at the side surface 5d of the rod integrator 5 travels toward the side surface 5f of the rod integrator 5, and the ray of light 4 traveled toward the side surface 5f of the rod integrator is then reflected at the side surface 5f.

After reflection of the ray of light 4 is repeated between the side surface 5d and the side surface 5f of the rod integrator 5, the ray of light 4 reached the emitting surface 5b of the rod integrator 5 is emitted outside the rod integrator 5 from the emitting surface 5b.

The ray of light 4 entered the rod integrator 5 is propagated in the rod integrator 5, during which the central part and peripheral parts of the light are mixed, thereby resulting in homogenized luminance distribution on the emitting surface 5b of the rod integrator 5.

Here, though the repeated reflection of the rays of light 2 and 4 at the side surfaces 5d and 5f of the rod integrator 5 is described, the reflection at the side surfaces 5c and 5e of the rod integrator 5 is not referred to. In reality, however, the rays of light 2 and 4 are repeatedly reflected between the side surface 5c and the side surface 5c of the rod integrator 5 similarly to the reflection at the side surfaces 5d and 5f.

In the third embodiment, in order to make the o lost spread angle of the ray of light 2 after entering the rod integrator 5 coincide with the outermost spread angle of the ray of light 4 after entering the rod integrator 5, the emitting end surface 11a of the fiber 11 is arranged to be parallel to the incident surface 5a of the rod integrator 5, while the central axis of the fiber 13 is inclined with respect to the central axis of the fiber 11 such that the emitting end surface 13a of the fiber 13 is inclined with respect to the incident surface 5a of the rod integrator 5.

Specifically, when the outermost spread angle of the ray of light 2 (the angle of the light 2a) has a half angle of 25 degrees for example and the outermost spread angle of the ray of light 4 (the angle of the hilt 4a) has a half angle of 15 degrees for example, the angular difference of the outermost spread angles of the ray of light 2 and the ray of light 4 is a half angle of 10 degrees. Thus, by inclining the central axis 4c of the ray of light 4 by 10 degrees with respect to the central axis 2c of the ray of light 2, the spread angles of the rays of light 2 and 4 after entering the rod integrator 5 coincide with each other. Therefore, when the emitting end surface 11a of the fiber 11 is parallel to the incident surface 5a of the rod integrator 5, the central axis of the fiber 13 is inclined with respect to the central axis of the fiber 11 such that the ray of light 4 enters the incident surface 5a of the rod integrator 5 with the incident angle of 10 degrees.

Due to such a configuration, the outermost spread angle of the ray of light 4 after entering the rod integrator 5 coincides with the outermost spread angle of the ray of light 2 after entering the rod integrator 5. Thus, there is no need to mount a projection optical system. Thus, even when a plurality of light sources emitting laser beams having different wavelengths (e.g. a red laser, a green laser, and a blue laser) is used, an uneven color due to mounting of a projection optical system is not generated.

In the above manner, in the third embodiment, the following effects can be achieved: a homogenized luminance distribution can be obtained on the emitting surface 5b of the rod integrator 5; and the spread angles of the plurality of rays of light 2 and 4 having different spread angles can be adjusted to a same angle.

In the third embodiment, the case where two rays of light 2 and 4 having different spread angles enter is described; however, this embodiment can be applied similarly to a case where a plurality of rays of light having different wavelengths or three or more rays of light having different spread angles enter.

When the wavelengths are different to each other, the effects can be achieved by setting the inclination of the central axes of the plurality of fibers by considering chromatic dispersion. Also, when three or more rays of light having different spread angles enter, the effects can be achieved by arranging the inclination of the central axes of the plurality of fibers with respect to the incident surface 5a of the rod integrator 5 to be different from each other such that the spread angles of the three or more rays of light after entering the rod integrator 5 coincide with each other.

For example, the following structure is adopted: an emitting end surface of the fiber emitting the ray of light having the largest spread angle is arranged to be parallel to the incident surface 5a of the rod integrator 5, and the central axes of other fibers are inclined such that the smaller the spread angle of the ray of light emitted from the emitting end surface of the fiber is, the larger the oblique angle of the central axis of the fiber with respect to the incident surface 5a of the rod integrator 5 becomes.

With such a configuration, this embodiment can be applied to a plurality of laser beams having different spread angles (e.g. a red laser beam, a green laser beam, and a blue laser beam).

Note that, within the scope of the present invention present intention may include flexible combinations of the respective embodiments, modifications of any component of the respective embodiments, or omissions of any component in the respective embodiments.

INDUSTRIAL APPLICABILITY

The light homogenization device according to the present invention is suitable for homogenization of luminance distribution of light, and in addition, suitable for homogenization of spread angles of a plurality of rays of light.

REFERENCE SIGNS LIST 1 condensing optical system (propagation optical system)
2, 2a, 2b light
2c central axis of light 2
3 condensing optical system (propagation optical system)
4, 4a, 4b light 4c central axis of light 4
5 rod integrator
5a incident surface
5b emitting surface
5c to 5f side surface
11 fiber (propagation optical system)
11a emitting end surface of the fiber 11
12 fiber (propagation optical system)
12a emitting end surface of the fiber 12
13 fiber (propagation optical system)
13a emitting end surface of the fiber 13

The invention claimed is:

1. A light homogenization device, comprising:
a propagation optical system configured to propagate light; and
a rod integrator having an incident surface and an emitting surface, wherein the light propagated through the propagation optical system enters from the incident surface, the light entered from the incident surface is propagated through the rod integrator with total reflection, and the light whose luminance distribution is homogenized is emitted from the emitting surface,
wherein when the propagation optical system propagates a plurality of rays of light having different spread angles, the plurality of rays of light is entered to the incident surface of the rod integrator with incident angles where spread angles of the plurality of rays of light after entering the rod integrator coincide with each other.

2. The light homogenization device according to claim 1, wherein the propagation optical system is formed by a condensing optical system to condense light on the incident surface of the rod integrator.

3. The light homogenization device according to claim 1, wherein the propagation optical system is formed by a plurality of fibers to emit light toward the incident surface of the rod integrator, and
an angle of an emitting end surface of each of the plurality of fibers with respect to the incident surface of the rod integrator is determined such that the spread angles of the plurality of rays of light after entering the rod integrator coincide with each other.

4. The light homogenization device according to claim 3, wherein, the emitting end surface of a fiber among the plurality of fibers which emits light having smaller spread angle is obliquely cut with respect to a central axis of the fiber such that the smaller the spread angle of light emitted from the fiber is, the larger the oblique angle of the emitting end surface of the fiber with respect to the incident surface of the rod integrator is.

5. The light homogenization device according to claim 3, wherein, a central axis of a fiber among the plurality of fibers which emits light having smaller spread angle is inclined such that the smaller the spread angle of light emitted from the emitting end surface of the fiber is, the larger the oblique angle of the central axis of the fiber is.

* * * * *